Aug. 6, 1946.  B. J. YANCHENKO  2,405,172
RIVETER
Filed March 10, 1944

INVENTOR
BASIL J. YANCHENKO
BY
Bodell & Thompson
ATTORNEYS

Patented Aug. 6, 1946

2,405,172

UNITED STATES PATENT OFFICE 2,405,172

RIVETER

Basil J. Yanchenko, Syracuse, N. Y., assignor to The Prosperity Company, Inc., Syracuse, N. Y., a corporation of New York Application March 10, 1944, Serial No. 525,877

1 Claim. (Cl. 78—48)

This invention relates to pneumatic riveters in connection with which a timer mechanism is used for timing the period of operation of the machine or the number of operations performed by the riveter head upon each operation of a control member or trigger, and has for its object a pneumatic riveter in which the riveter and timer are one or a unitary structure, or the timing mechanism is located within the handle or the portion of the handle grasped by the operator in contradistinction to being located outside of the riveter or outside of the handle, as an additional part, or as a part applied to the riveter.

The invention consists in the novel features and in the combinations and constructions hereinafter set forth and claimed.

In describing this invention, reference is had to the accompanying drawing, in which like characters designate corresponding parts in all the views.

Figure 1:
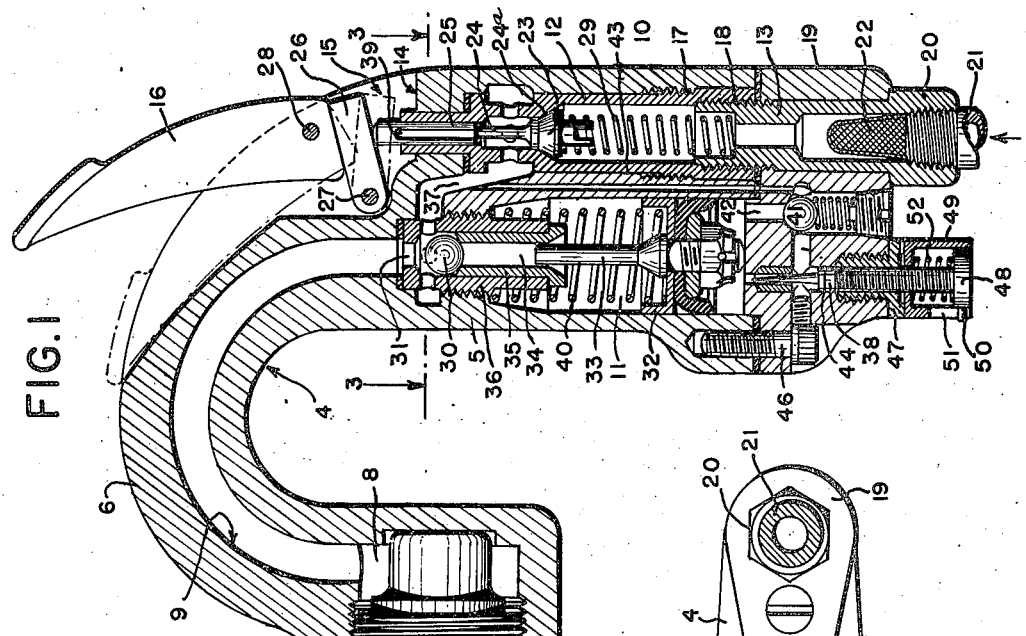
Figure 1 is a side elevation of one form of pneumatic riveter embodying this invention, the handle containing the timer mechanism being shown in section.
Figure 2:
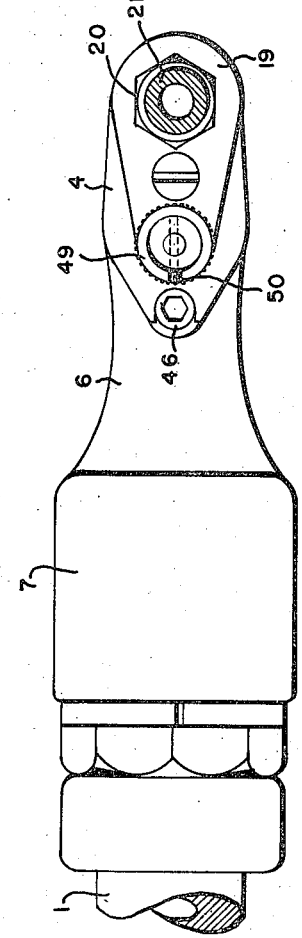
Figure 2 is a fragmentary view looking upwardly in Figure 1.
Figure 3:
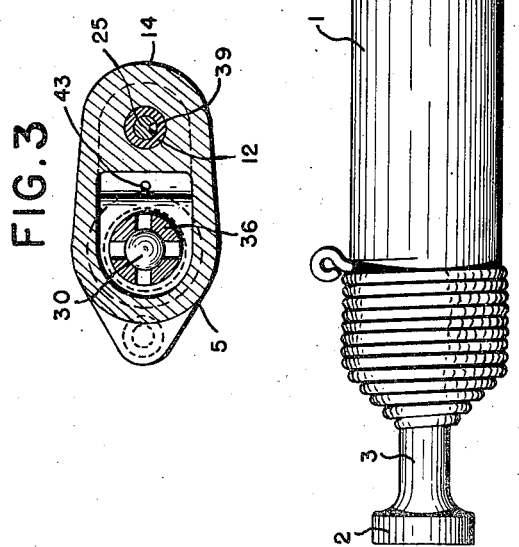
Figure 3 is a sectional view on the plane of line 3—3, Figure 1.

The riveter is here shown as provided with a pistol grip handle connected to the body or barrel of the riveter containing the riveting mechanism, by a curved shank or goose-neck, although it may be embodied in any other form of handle, as a unitary part of the riveter. The riveter itself may be of any well known construction.

The timer mechanism shown herein is substantially the same as that disclosed in my pending application, Serial Number 512,885, filed December 4, 1943, with the exception of certain minor details, one being that the intake valve is conical, so that the air may be throttled thereby and also this intake or control valve is not a double valve or a combined intake and exhaust valve, as in the pending application.

I designates the body or barrel of the riveter in which the pneumatically operated riveting mechanism is located for operating the head 2 on the plunger 3. 4 designates generally the handle as a whole, this, as before stated, in this embodiment of my invention being shown as a pistol grip. It includes the pistol grip portion 5 and a shank portion 6 in the form of a goose-neck, which has a hub or nipple 7 detachably secured as by threading on one end of the barrel or body 1 of the riveter. The hub or nipple 7 has an air chamber 8 therein, which communicates in any well known manner with the cylinder or other pneumatic means within the barrel or body 1 and which also is connected, as by a passage 9 in the shank 6, to a source of air through the timer mechanism in the pistol grip 5. The grip handle 5 is provided with bores extending lengthwise thereof and opening through the butt end face of the pistol grip or a cap at the butt end in which bores 10 and 11 are located intake valve mechanism and timer mechanism respectively.

The intake valve mechanism includes a valve casing and a valve in the casing. The casing consists of alined sections 12 and 13. The section 12 extends at its upper end through a top face 14 provided at the bottom of a recess 15 in the handle, in which recess the control member or trigger 16 is located and threads into its bore 10 at 17. The section 13 threads at 18 into the lower end of the section 12 and this section 13 also extends through a cap or closure 19 at the butt end of the handle and has a coupling at 20 at its outer end for connection to an air feed conduit 21. A suitable screen 22 is provided at the inner end of the conduit. 23 designates the intake valve, this being here shown as conical instead of discoidal, in order to permit a certain amount of throttling. It coacts with a conical seat 24a near the upper end of the valve casing section 12 and is provided with a stem 24 having an enlarged portion 25 extending above the end of the casing section 12 and the face 14 where it coacts with a lever 26, which is actuated by the trigger 16. The lever 26 is located in the recess 15 and pivoted at 27 therein. The trigger 16 extends into the recess and is pivoted at 28 therein. In operation, the trigger moves downwardly from out of the recess into the recess, as shown in the dotted line position (Figure 1). The intake valve 23 is opened against the action of a suitable returning spring 29. This valve 23 differs from the combined intake and exhaust valve shown in my pending application referred to in that it being conical, it permits throttling of the air passing through the valve casing.

The timer mechanism located in the bore 11 consists of a valve 30 here shown as a ball normally in open position to permit the flow of air to the riveter through the passage 9 and means for regulating the time period it requires for the ball to be moved against its seat 31 and cut out the flow of air through the passage 9 to the riveter, and a piston 32 movable in the bore 11, which serves as a cylinder bore and having a stem 33 movable through a passage 34 in a bushing 35 to engage the ball 30 and move it against its seat 31. The ball normally engages a seat at the upper end of the bushing 35. The bushing extends into a valve casing 36 which threads into the upper end of the bore 11, this casing having a port alined with the passage 9 and also ports arranged to receive air from a transfer passage 37 leading from the intake valve casing. The flow of air to the bore or piston chamber 11 to actuate the piston 32 therein is controlled by means of a pressure regulating valve, which usually includes a metering pin 38 located in a bore, in the cap 19, the adjustment of this pressure regulating valve determining the time it takes the piston 32 to move into position to close the ball valve 30.

The section 12 of the valve casing of the intake valve is provided with suitable ports above the valve 23 opening into the transfer passage 37. The enlargement 25 of the stem 24 of the intake valve is provided with a lengthwise slot or groove 39 which, when the intake valve 23 is closed, extends above the upper end of the section 12 of the intake valve casing, but opens at its lower end into the valve casing above the intake valve 23, so that normally the air is free to exhaust back from the piston chamber through a check valve 41 and passage 42, 43.

The operation of the piston 32 by air is against a returning spring 40. A quick exhaust of the air from the piston chamber or bore 11 around or by-passing the pressure regulating valve or metering pin 38 is effected by a normally closed, spring pressed check valve 41 controlling an exhaust passage 42 communicating with a combined intake and exhaust passage 43, when the valve 41 is open. When the ball valve 30 is closed by the piston 32, at which time the spring 40 is compressed, and the operator releases the trigger 16, the intake valve 23 will be closed by its spring 29, thus moving its stem 24 and enlarged portion 25 thereof upwardly, so that the groove 39 opens into the outer air, permitting the air to exhaust through the passage 42, 43. As soon as the intake valve 23 is thus closed, the spring 40 reacts suddenly, forces the check valve 41 from its seat, permitting the air to exhaust quickly from in front of the piston 32 out through the passages 42, 43 and groove 39.

When the intake valve is opened by the operation of the trigger, the air passes through the transfer passage 37 and the open ball valve 30 through the passage 9 to the riveter operating the riveter, and at the same time passes through the passage 43, bore 44 around the closed check valve 41 and past the metering pin 38 into the cylinder bore 11 to actuate the piston therein. The exhaust of air is in the reverse direction, a small amount passing through the metering pin, but the most, past the open check valve 41, when the piston is being returned to starting position by its spring 40.

The cap 19 is detachably secured at the butt end of the handle, as by screw 46 and the intake valve portion 13. The metering pin threads into a gland 47 threading into a bore in the cap 19. The metering pin has a head 48 at its outer end. The head is located in a cup 49 slidable axially on the portion of the metering pin extending outside of the cap 19 but keyed to the head 48, as by a pin 50 extending in a lengthwise slot 51. The axial movement of the cup is against the action of returning spring 52. The cup has a suitable holding or detent means on the outer face of its bottom, which coacts with similar detents on the outer end of the gland 47. Also, the periphery of the cup is knurled. For adjusting the metering pin, the cup 49 is moved downwardly against the action of its spring, thus disengaging its detent means, and then turned more or less in one direction or the other to adjust the metering pin axially. When the adjustment is completed, the cup is released and its spring will return it to holding position in the new location of the metering pin.

The general operation of the timer is as in my pending application referred to. When the trigger 16 is operated, the upper enlarged portion of its stem, which is an exhaust valve, closes the exhaust of air through the groove 39. Hence, air under pressure passes through the transfer passage 37, past the open cut off valve or ball 30, the passage 9 and into the riveter. It also passes through passages 43, 44 past the metering pin into the cylinder bore 11 and starts to actuate the piston therein. The speed of the piston is controlled by the position of the metering pin, that is, the pressure against the piston is controlled by the metering pin. When the piston 32 has been actuated far enough to contact the ball 30, there is a momentary pause, because of the pressure against the opposite side of the ball. The pressure in front of the piston 32 is built up a trifle further and causes the ball 30 to close against its seat 31 with a quick action. Thus, the number of blows struck by the riveter within a given time is regulated by the setting of the pressure regulating valve or metering pin. Also, the intake valve 23, which is conical, may be used to throttle, as when the trigger 16 is fully operated, the valve 23 may be fluctuated axially for a limited distance. Thus, the operator may, by throttling, vary the power of the riveter but the total number of blows will be the same, as if the intake valve were wide open during each operation.

By the construction or location of the timer in the handle of the riveter, the riveter and timer is a single or unitary compact structure and not two units, where one unit is an accessory to or built into another unit.

What I claim is:

A pneumatic riveter including a body, a shank projecting from the body, a grip handle carried by the shank, a control member mounted on the handle, the handle being formed with parallel bores opening through the butt end thereof, and with a transfer passage from one bore to the other, the shank being formed with a passage leading from the transfer passage, and the shank being formed with a passage leading from the transfer passage to the body of the riveter, a control valve including a movable member located in said one of the bores, connections between the control member and the valve member to operate it, timer mechanism located in the other of the bores for timing the period of operation of the riveter upon each operation of the control member, the timer mechanism including a normally open valve controlling the passage of air through the passage in the shank, the timer valve being closed by the operation of the timer, and a bypass leading from the transfer passage to the timer, the timer including a movable part operated by the air pressure through the by-pass, to close the timer valve, an air connection at the butt end of the handle for the control valve and adjustable pressure regulating means for the timer including a part exposed at the butt end of the handle.

BASIL J. YANCHENKO.